(12) United States Patent
Ramasamy et al.

(10) Patent No.: US 8,630,667 B2
(45) Date of Patent: Jan. 14, 2014

(54) METHODS AND APPARATUS FOR PAGING RECEPTION IN MULTIMODE WIRELESS NETWORKS

(75) Inventors: Venkatasubramanian Ramasamy, San Jose, CA (US); Girl Prassad Deivasigamani, San Jose, CA (US); Srinivasan Vasudevan, Sunnyvale, CA (US); Mohit Narang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 740 days.

(21) Appl. No.: 12/643,921

(22) Filed: Dec. 21, 2009

(65) Prior Publication Data

US 2011/0096706 A1    Apr. 28, 2011

Related U.S. Application Data

(60) Provisional application No. 61/254,591, filed on Oct. 23, 2009.

(51) Int. Cl.
H04B 7/00 (2006.01)

(52) U.S. Cl.
USPC ........................................ 455/466; 370/328

(58) Field of Classification Search
USPC .......... 455/69, 466, 522, 552.1; 370/328, 347
See application file for complete search history.

(56) References Cited

U.S. PATENT DOCUMENTS

| 2003/0054850 | A1* | 3/2003 | Masseroni et al. ............ 455/522 |
| 2003/0224771 | A1* | 12/2003 | Nogueiro et al. ............ 455/418 |
| 2006/0154677 | A1* | 7/2006 | Kim ............................. 455/466 |
| 2006/0159059 | A1* | 7/2006 | Vaittinen et al. .............. 370/347 |
| 2006/0165033 | A1* | 7/2006 | Vaittinen et al. .............. 370/328 |

FOREIGN PATENT DOCUMENTS

| EP | 1 619 914 A1 | 1/2006 |
| JP | 2006-087092 A | 3/2006 |
| JP | 2006191640 A | 7/2006 |
| JP | 2007-537621 A | 12/2007 |
| WO | WO 01/76165 | 10/2001 |
| WO | WO 2005/104600 | 11/2005 |

OTHER PUBLICATIONS

Mexican Application No. MX/a/2012/004729—Office Action dated Jun. 6, 2013.
JP Office Action, Application No. 2012-535381, dated Jul. 10, 2013.
Australian Patent Examination Report, Application No. 2010-310592, dated Jul. 31, 2013.

\* cited by examiner

*Primary Examiner* — Wayne Cai
*Assistant Examiner* — Myron K Wyche
(74) *Attorney, Agent, or Firm* — Womble Carlyle Sandridge & Rice LLP

(57) ABSTRACT

Methods and apparatus enabling a mobile device to receive paging notifications from multiple networks. In one embodiment of the present invention, a first device connected to a first network momentarily ignores the first network, to monitor a second network instead. The first device identifies and prioritizes a list of applications of the first network; the prioritized listing allows the first device to preempt one of its lower priority tasks to monitor the second network for paging messages instead. The described methods and apparatus enable e.g., GSM paging for Class B cellular devices which are connected to GPRS NMO-2 type networks. The Class B cellular device can ignore certain GPRS data (which is tolerant to error), to decode GSM paging channels, which would otherwise be missed.

20 Claims, 6 Drawing Sheets

| Priority | Application |
| --- | --- |
| 1 | Push Email |
| 2 | CS Paging Decode |
| 3 | HTTP |
| 4 | SMTP |

FIG. 4

METHODS AND APPARATUS FOR PAGING RECEPTION IN MULTIMODE WIRELESS NETWORKS

PRIORITY

This application claims priority to U.S. Provisional Patent Application Ser. No. 61/254,591 filed Oct. 23, 2009 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to methods and apparatus for paging channel reception in packet switched and circuit switched networks.

2. Description of Related Technology

Wireless communication can be realized either in a circuit switched (CS) architecture, or in a packet switched (PS) architecture. Circuit switched networks utilize a continuous connection for user data exchanges. For example, a circuit switched cellular network connects one mobile device through the cellular network to another mobile device using a "fixed" connection. CS routed connections remain unchanged for the duration of the connection. In contrast, Packet switched networks do not have a "fixed" connection like CS connections. Instead, PS connections are routed flexibly on a network of elements; the underlying transport route is not pre-defined and may dynamically hop between network elements.

PS networks segment data into small "packets" for transfer. Each packet comprises a routable Network Address (e.g. Internet Protocol (IP) address) of both the source and destination terminals. On a low level, PS based calls are fluid; however, high level software negotiates various parameters to ensure integrity of the connection (i.e., that all packets will be received), using redundancy, or error correction, etc., and also imposing any QoS requirements (e.g., latency). PS connections may be configured to support such varying application requirements, such as data latency, throughput, bandwidth, robustness, etc.

The differences in operation between circuit-switched and packet-switched delivery models are sometimes incompatible. However, for various reasons, interoperation between circuit switched and packet switched networks is desirable. For example, within cellular networks, early incarnations have been primarily circuit switched. However, with newer data technologies, cellular networks are migrating to packet switched network topologies. Moreover, even circuit-switched cellular networks may bridge to packet-switched networks via, e.g., gateways and other similar components.

GSM, GPRS, EDGE Network Interoperation—

GSM (Global System for Mobile communications) is one exemplary implementation of a "second-generation" or "2G" cellular telephone technology. GSM technologies are circuit switched. GPRS (General Packet Radio Service) is a packet-oriented mobile data service available to users of GSM to support packetized data services. GPRS is considered a 2.5G cellular technology, and uses the same Radio Access Network (RAN) as GSM. EDGE (Enhanced Data rates for GSM Evolution), or Enhanced GPRS (EGPRS), provides still further improvements to existing GSM networks. EDGE is considered a "third-generation" or "3G" cellular technology and is a fully packet switched network.

The GSM, GPRS, and EDGE mixed networks bridge the gap between circuit switched and packet switched networks. Unlike fully CS based networks or fully PS based networks, mixed networks (i.e., that support CS and PS based routing) are subject to special considerations and constraints. For example, the Dual Transfer Mode (DTM) protocol enables CS voice and PS data coexistence on the same GSM radio channel. A mobile phone which is DTM-capable can support simultaneous voice connections (via CS), and packet data connection (via PS) in GSM/EDGE networks. The implementation of DTM capability is not straightforward, and GSM/GPRS/EDGE equipment is further subdivided into various classes offering various degrees of legacy support. Mobile devices are split into Class A, Class B, and Class C devices. Network devices may operate in three (3) Network Operation Modes (NMOs): NMO-1, NMO-2, and NMO-3.

Class A mobile devices can simultaneously connect to both a GSM and GPRS/EDGE network; i.e., a Class A device supports simultaneous operation of CS and PS connections. In contrast, Class B mobile devices can automatically connect calls from either a GSM or GPRS/EDGE network, but not simultaneously. Once a Class B device has opened a PS connection, incoming CS domain calls are ignored (and vice versa). Lastly, a Class C mobile device must be manually configured to operate in only a GSM, or a GPRS/EDGE network. Class C mobile devices only connect to one network.

Network apparatus are classified into NMOs by paging capabilities and support. Paging has special significance for mixed networks, as will be described in greater detail hereinafter. Briefly, NMO-1 network structures jointly page devices in both the GSM (CS) and GPRS/EDGE (PS) domains. In other words, the network entities (e.g., Mobile Switching Center (MSC), GPRS Support Node (GSN), etc.) maintain internal dialogues to ensure consistent paging of a device in both GSM and GPRS paging channels.

In contrast, NMO-2 only transmits paging messaging in the GSM domain; GPRS services are paged via the existing GSM paging channels. The GSM network entities receive GPRS pages from GPRS network entities; once received, the pages are forwarded via the GSM control channels.

Lastly, NMO-3 configurations completely decouple paging operations between GSM and GPRS networks. Unfortunately, in NMO-3 networks, a mobile device must monitor both GSM and GPRS paging channels simultaneously; as conceivably, a page could be received on either.

Within the context of GSM/GPRS/EDGE paging, subscribers have reported that Class B mobile devices, operating in non-DTM NMO-2 networks, may miss CS voice calls. Furthermore, the problem is significantly exacerbated in Packet Switched data services that have persistence (e.g., static IP applications, such as "push" data notifications, etc.). Unfortunately, recall that NMO-2 network entities only provide paging messages using the existing GSM channels; however, once a Class B mobile device is occupied with GPRS/EDGE service, GSM messaging is ignored. Clearly, the prior art GSM/GPRS/EDGE solutions for combining CS and PS domain operation suffers from a "blind spot" in operation.

Thus, improved solutions are required for paging operation within, e.g., GSM/GPRS/EDGE networks. Such improved solutions should fully support the entire network transition from GSM, through GPRS and EDGE networks without adversely impacting user experience. More generally however, improved methods and apparatus are needed for paging within coexisting networks. Such improved solutions should ideally enable transitions from a first network to a second network under normally exclusionary conditions.

SUMMARY OF THE INVENTION

The present invention satisfies the aforementioned needs by providing improved apparatus and methods for paging in a wireless network.

In a first aspect of the invention, a method for improved paging in a wireless network is disclosed. In one embodiment, services on a mobile device are prioritized, and the priority structure applied so as to permit paging messages issued over one network to be received regardless of potentially interfering activities or processes within the mobile device or a second network in communication with the mobile device.

In a second aspect of the invention, an apparatus for implementing paging functionality is disclosed. In one embodiment, the apparatus includes a mobile cellular communications device adapted to interface with a GSM network.

In another embodiment, the apparatus includes: a digital processor; a primary wireless interface in data communication with the processor; a secondary wireless interface in data communication with the processor; and a storage device in data communication with the processor, the storage device comprising computer-executable instructions. When executed by the digital processor, the instructions: create a list of applications, the list of applications based at least in part on one or more applications coupled to the primary wireless interface; add accesses to the secondary wireless interface to the list of applications. For each application of the list of applications, the instructions assign a corresponding priority; schedule one or more evaluation events; and during an evaluation event, select and execute one application from the list of applications, based on the assigned priorities.

In a third aspect of the invention, a computer-readable apparatus is disclosed. In one embodiment, the apparatus includes a storage medium with a computer program disposed thereon which, when executed on a processor of a host device, implements paging of a mobile device in either a first network or a second network under normally exclusionary conditions (e.g., simultaneous circuit switched and packet switched operation).

In a second embodiment, the program includes a plurality of instructions configured so that when executed by a processor of a host device, implement preferential paging reception over one or more applications by: causing coupling of a primary interface of the host device to a communications medium, the primary interface supporting at least one error tolerant application; checking a secondary interface for paging messages without suspending the primary interface; and ignoring resulting errors, in the at least one error tolerant application.

In one variant, the host device is a wireless mobile device, and the first interface is a wireless interface; one of the first interface and second interface communicates with a circuit switched network, and the other of the first interface and second interface communicates with a packet switched network.

In a fourth aspect of the invention, an improved wireless communication system is disclosed.

In a fifth aspect of the invention, methods of doing business based on the improved paging methods and apparatus described above are disclosed.

In a sixth aspect of the invention, a method for receiving messages is disclosed. In one embodiment, the messages are received via a secondary network while connected to a primary network, the primary and secondary networks being normally exclusionary, and the method includes: scheduling one or more evaluation events; prioritizing one or more applications in communication with the primary network; for each evaluation event, determining if the secondary network should be checked for messages. For evaluation events which should be checked for messages, the method further includes: ignoring one or more application data elements received via the primary interface associated with the one or more applications; and detecting messages on the secondary interface.

In one variant, the primary network is packet-switched, and the secondary network is circuit-switched. For example, the primary network can be a General Packet Radio Service (GPRS) network, and the secondary network a Global System for Mobile communications (GSM) network. Coupling to the secondary interface occurs for instance during a GPRS Temporary Block Flow (TBF) period, or during a GPRS idle frame period (e.g., after a successful GPRS Base Station Identity Codes (B SIC) decode period).

In a seventh aspect of the invention, a method for supporting paging reception preferentially over one or more applications in a mobile device is disclosed. In one embodiment, the mobile device is coupled to a primary interface, the primary interface supports at least one error tolerant application, and the method includes: checking a secondary interface for paging messages without suspending the primary interface; and ignoring resulting errors in the at least one error tolerant application.

In one variant, if at least one paging message is found, the primary interface is suspended. In another variant, if no paging message is found, continuing the primary interface.

In another variant, the at least one error tolerant application includes a priority and a Quality of Service (QoS) parameter, with the priority based at least in part on the QoS parameter.

In yet another variant, the primary and secondary interfaces are substantially time aligned, and the method additionally includes determining a schedule for the act of checking the secondary interface, the schedule based at least in part on a shared time event. The shared time event includes for example a frame or slot boundary.

In an eighth aspect of the invention, a method of operating a Class B mobile wireless device so as to provide virtual simultaneous connectivity with both packet-switched and circuit-switched networks is disclosed. In one embodiment, the method includes: identifying at least one opportunity within the operation of the packet-switched network; and decoding a paging channel associated with the circuit-switched network only during the at least one opportunity.

In one variant, the method further includes not suspending or interrupting operation of an application associated with the packet-switched network in order to obtain one or more paging messages sent over the paging channel.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4 is one exemplary priority table ranking of the relative importance of applications, according to one embodiment of the present invention.

DETAILED DESCRIPTION OF THE INVENTION

Reference is now made to the drawings, wherein like numerals refer to like parts throughout.
Overview In one aspect, the present invention provides methods and apparatus for paging a first device in either a first network or a second network under normally exclusionary conditions. In one exemplary embodiment, the present invention allows a Class B mobile device to receive pages from a GSM network (circuit switched), while remaining connected to a GPRS network (packet switched). The nature of circuit switched and packet switched networks are normally exclusionary for a single interface; i.e., a device cannot use circuit switched and packet switched protocols simultaneously on the same interface. However, aspects of the present invention enable a Class B mobile device to operate in a GPRS packet switched network, while advantageously still monitoring the paging channels of a GSM circuit switched network, using the same radio interface.

In one implementation of the present invention, the device generates a listing of priorities for its currently running applications. Thus, when the device has a number of relatively low priority tasks, the device can instead divert attention to paging access of a secondary network. As discussed in greater detail hereinafter, the Class B mobile device can accordingly receive GSM paging channel access during GPRS idle periods.

In another aspect of the invention, the device can "commandeer" the resources used by one or more of its current applications, for receiving pages in a secondary network instead. Most data applications are already tolerant to some degree of data loss, or alternatively, data applications may not be particularly useful to the device. By intentionally ignoring such data applications, the device can divert its attention to monitoring another network. Thus, in another example, the Class B mobile device can receive GSM paging channel access instead of other error tolerant applications (such as web browsing, or background tasks).
Detailed Description of Exemplary Embodiments Exemplary embodiments of the present invention are now described in detail. While these embodiments are primarily discussed in the context of paging mechanisms of a GSM, GPRS/EDGE mixed cellular network, it will be recognized by those of ordinary skill that the present invention is not so limited. In fact, the various aspects of the invention are useful in any wireless network (whether cellular or otherwise) that can benefit from simultaneous operation of multiple paging mechanisms described herein including without limitation ad hoc networks and peer-to-peer wireless networks.

Figure 1:
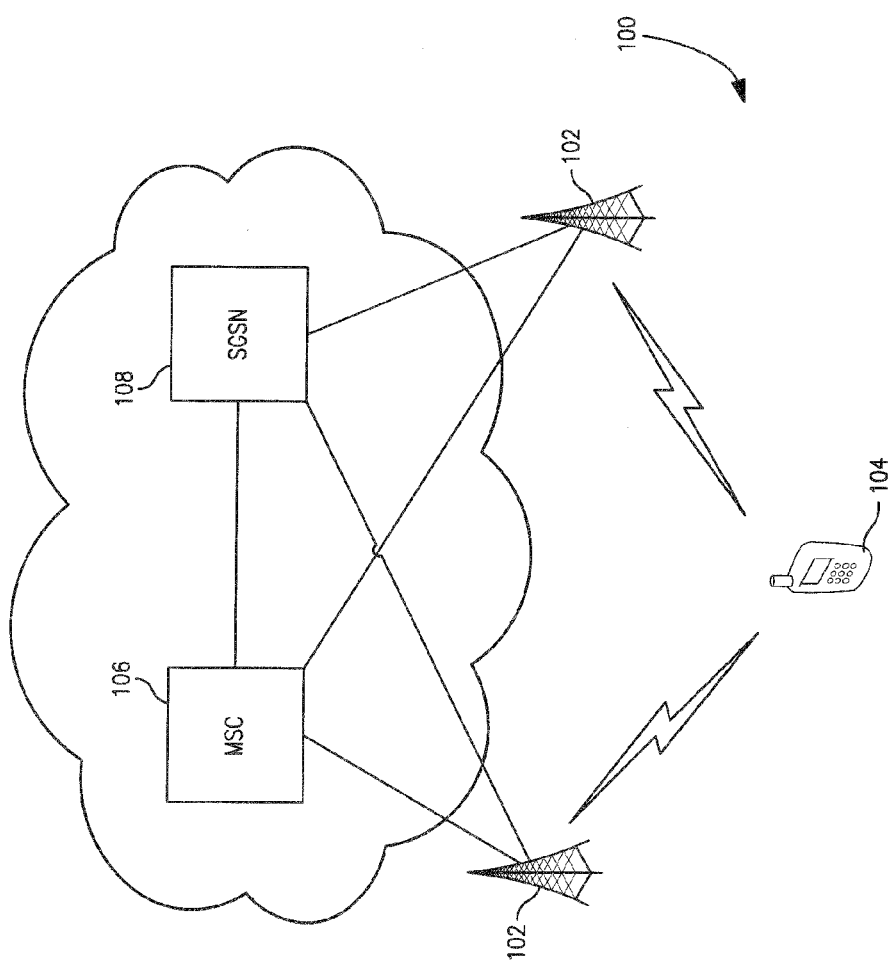
FIG. 1 is a graphical illustration of a GSM/GPRS network comprising a Mobile Switching Center (MSC), Serving GPRS Support Node (SGSN), and several base stations and mobile devices, useful with one embodiment of the present invention.

FIG. 1 illustrates one exemplary cellular network 100 useful with various embodiments of the invention. A cellular radio system comprises a network of base stations (BTS) 102, each of which provides radio coverage within a "cell" for a mobile device 104. The network of cells is managed by one or more network entities. Two network entities are shown, a first GSM Mobile Switching Center (MSC) 106, and a Serving GPRS Support Node (SGSN) 108. As shown, the MSC and SGSN may communicate with a mobile device using the same BTS, or alternatively, a dedicated BTS.

GPRS and GSM use the same radio access methods, based on Frequency Division Duplex (FDD) and TDMA (Time Division Multiple Access) in combination. FDD operation provides each user a pair of up-link (UL) and down-link (DL) frequency bands. Within GSM/GPRS, the UL/DL frequency bands are specified by an ARFCN (Absolute Radio Frequency Channel Number) which designates a pair of physical radio carriers, one for the uplink signaling and one for the downlink signaling. Additionally, each of the UL/DL frequency bands is separated in time, for TDMA operation. TDMA systems divide the radio channel into time slots. Each user is assigned a time slot. This allows multiple users to share the same radio frequency channel.
Paging Mechanisms—

Paging mechanisms are used in many wireless radio communication systems. Paging mechanisms allow a wireless device to free up radio resources to, inter alia, and minimize power consumption or direct resources to other tasks. Paging is generally characterized by two (2) types of modes, "connected" modes, and "unconnected" or "idle" modes. In idle modes, the wireless device periodically monitors a paging channel, but otherwise remains inactive. Once a wireless device receives a paging channel message, it "wakes up" to respond. In connected or active modes, the wireless device is in active communication with another device until the connection is terminated or suspended. Various technologies may further subdivide connected and idle modes into various other sub-states.

In GSM mobile networks, a mobile terminal is paged via a CCCH (Common Control Channel). The CCCH is carried as a logical channel on the physical Broadcast Control Channel (BCCH). The BCCH is a point to multipoint, unidirectional (downlink) radio channel used in GSM cellular networks. Any GSM ARFCN that includes a BCCH is designated as a "beacon" channel, and is required to transmit continuously at full power. The CCCH channel is used to set up a communication link between the base station and the mobile terminal. The CCCH carries paging requests and channel assignment messages for the mobile device. The CCCH is further split into a paging channel (PCH) and an access grant channel (AGCH). Idle mobile devices monitor the CCCH for PCH service notifications from the network.

Some GPRS networks support an additional physical channel for paging, in addition to the BCCH (CCCH). The Packet Common Control Channel (PCCCH) is a physical channel specific to GPRS networks. GPRS cells do not have to provide a PCCCH. If a cell does not have PCCCH channels, then the base station in the cell pages a GPRS terminal via existing CCCH channels (transmitted in the BCCH).

Referring back to the previous discussion of Network Operation Modes (NMOs), networks which support consistent paging messages on the CCCH and a PCCCH, are classified as NMO-1. The coexistence of paging mechanisms for both GSM and GPRS enables mobile devices reception of paging messages for GSM or GPRS, regardless of operational status. For example, during a GPRS packet data call, the mobile device is able to receive a GSM voice call via either the CCCH, or PCCCH. The consistent paging between GSM and GPRS ensures that no pages will be inadvertently missed.

On the other hand, NMO-3 networks can receive GSM paging through either the CCCH or GPRS paging through the PCCCH, but only one at a time. Since the CCCH and PCCCH are inconsistent (i.e., paging messages are not shared), there is no ambiguity. The mobile can only receive a GPRS page from the PCCCH, or a GSM page from the CCCH.

In contrast to NMO-1 and NMO-3, NMO-2 networks could potentially drop pages for Class B devices. An NMO-2 network provides GPRS pages via the GSM infrastructure (e.g., CCCH). After the device responds to the GPRS page via the GSM CCCH, the device moves to a dedicated GPRS Packet Data Traffic Channel (PDTCH) to consume the data services. Unfortunately however, Class B devices can only support either a GPRS or a GSM call at any given time. Thus, once a Class B device is connected in a NMO-2 network on a GPRS call, the GSM paging channel is no longer being monitored. Consequently, future paging notifications (on the CCCH) are completely ignored by prior art devices.

Previously, data usage was sporadic and used large amounts of bandwidth for relatively short amounts of time. However, packet based data usage models have become increasingly popular in recent years due to their efficient bandwidth usage. The use of packet data for low bandwidth, constant or semi-constant data rate applications (e.g., push email, persisting IP connections, etc.) has steadily increased. Accordingly, as the PS data continues to increase in connection length, the duration of GPRS data connections increases as well. Longer duration GPRS data connections further increase the probability of missing one or more GSM pages.

Example Operation—

Figure 2:
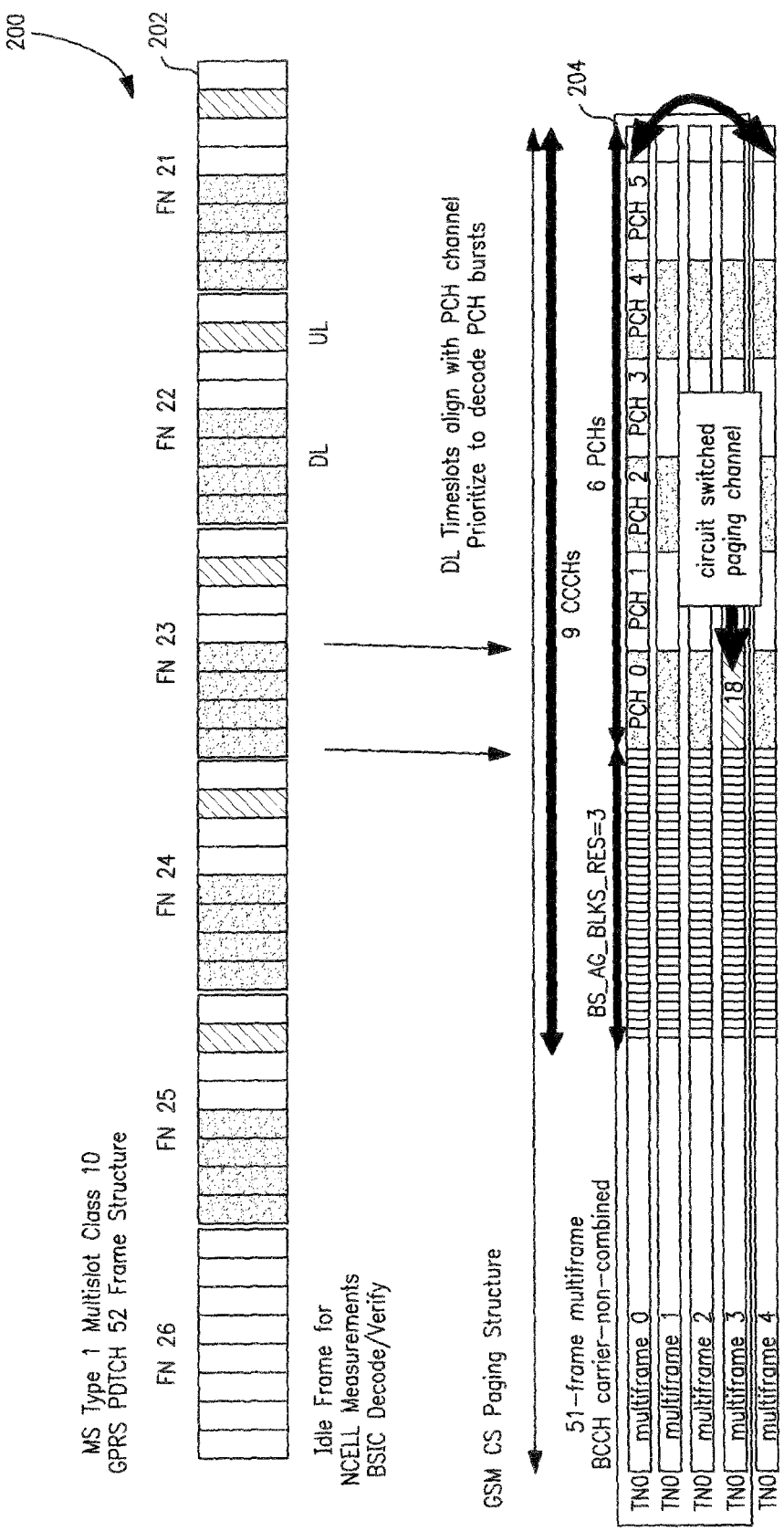
FIG. 2 is a graphical illustration of abbreviated portions of a GSM channel structure, including Paging Channels (PCH), in time alignment with a GPRS Packet Data Traffic Channel (PDTCH), useful with one embodiment of the present invention.

Referring now to FIG. 2, one exemplary GPRS PDTCH 202 and one exemplary GSM BCCH 204 are shown in the time domain. As shown, a GSM Control Multi-frame 202 comprises fifty-one (51) frames and has a total duration of 235.4 ms. The control multi-frame is further subdivided into logical channels which are scheduled in time. One such logical channel is the Common Control Channel, which consists of several further sub-channels, including a number of Paging Channels. Each Paging Channel (PCH) is four (4) time slots in length. Other details regarding GSM channel construction are described in the widely published GSM Standard, 3GPP TS 05.03: "Channel coding", incorporated herein by reference in its entirety. Furthermore, it is appreciated that the details regarding implementation-specific quantities (such as frame lengths, durations, number, etc.) used throughout are provided for clarity and illustration, and are not required for practice of the invention.

Also shown in FIG. 2 is one GPRS PDTCH frame structure. As previously stated, the GPRS frame structure is built over the existing GSM frame structure; radio channel traits are shared between the two technologies (e.g., GSM and GPRS share the same slot and frame timing, as well as power constraints). Accordingly, during PDTCH operation, four (4) time slots of GPRS data have the same time duration as the GSM PCH. Alignment between the two channels may not be perfect as some degree of time shift may be present due to varying transmission distances, etc. Time shift correction is an artifact of GSM/GPRS/EDGE cellular networks, and solutions are well known in the applicable arts.

In one embodiment of the present invention, the mobile device determines the alignment between the GPRS PDTCH and GSM PCH (which is transmitted within the CCCH of the BCCH), then based on one or more application considerations the mobile device identifies a circuit switched (CS) paging decode period. During the CS paging decode period, the mobile device identifies its current application priorities. If the application priorities are not high priority, then the mobile device tunes to the GSM BCCH, and decodes the PCH burst. During the GSM PCH decode, some data may be lost. Thus, the prioritization step allows the mobile device to tradeoff between lossy GPRS data reception and GSM voice call reception.

In one aspect of the present invention, the mobile device and current GPRS network do not suspend the ongoing GPRS data transfer to decode GSM Paging channel. In a second aspect of the invention, the mobile device may prioritize different services, including GSM paging reception. So, for example, the user may have different packet switched services, each with different Quality of Service (QoS) requirements. Certain services could be delay-insensitive (or a background class, such as web browsing). Other applications may be delay-sensitive (e.g., streaming video or audio). Hence, in one such example implementation of the invention, web browsing may be given lower priority than collecting circuit switched GSM paging messages, whereas streaming video or audio may be given higher priority than collecting GSM pages.

Figure 3:
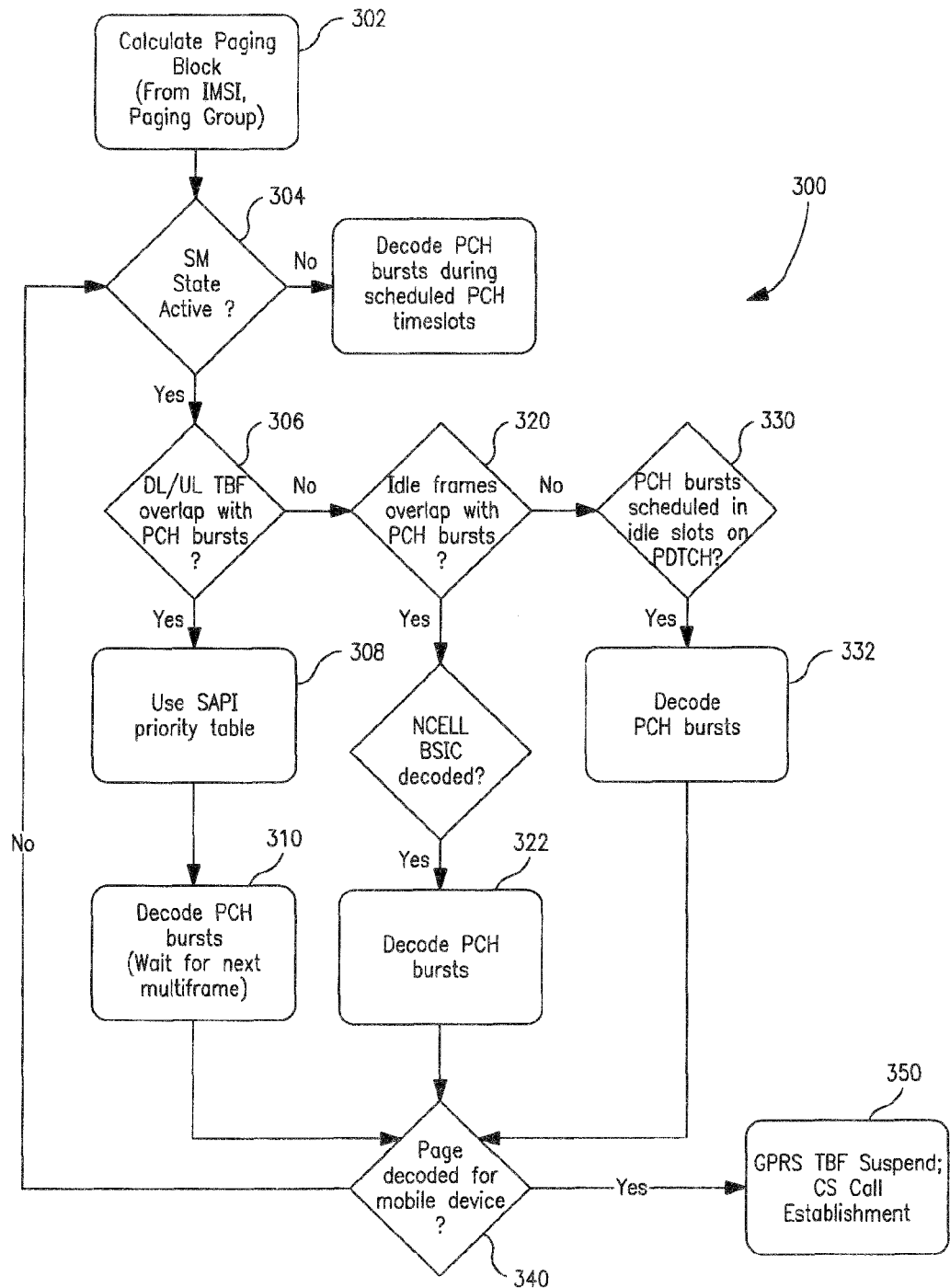
FIG. 3 is a logical flow diagram showing one specific implementation of an improved method for enabling GSM paging channel notification reception by Class B mobile devices, while connected to a GPRS data channel, in accordance with one embodiment of the present invention.

As shown in FIG. 3, a process diagram is provided further illustrating the implementation-specific paging channel mechanism of the mobile device of the invention (here, operating in a GSM/GPRS/EDGE network). At step 302, the mobile device calculates a paging block for the GSM network (the paging block for each subscriber is calculated from the International Mobile Subscriber Identification (IMSI)). As shown, the BS_PA_MFRMS parameter defines the periodicity of PCH subchannel paging decoding. The value is broadcast on BCCH, and may range from 2 (two) to 9 (nine). For instance, if the value is equal to 9 (nine), the MS will decode its paging subchannel every Paging Cycle.

At step 304, the mobile device checks its GPRS session management (SM) state machine. If the mobile device has an ongoing session, then the mobile device proceeds to adjust its paging operations in accordance with the present invention. Alternatively, if the device does not have an active GPRS session, then the mobile device executes legacy NMO-2 paging. In other embodiments, the transition to the following steps may be triggered by the initiation of a GPRS call (i.e., step 304 is triggered by session entry/exit).

Each of the following steps is based on GPRS implementation specific details. These discussions should be regarded as helpful clarification of the generalized methods and apparatuses described hereinafter (see discussion of "Methods" and "Exemplary Apparatus" presented elsewhere herein). As will be described in greater detail hereinafter, the inventive mobile device in one embodiment "commandeers" the underutilized or idle periods for decoding the GSM PCH. Thus, it is appreciated that underutilized or idle periods may differ for other protocols, or systems.

There are two (2) potentially underutilized periods within GSM/GPRS/EDGE networks: (i) Temporary Block Flow (TBF), and (ii) idle.

A Temporary Block Flow (TBF) is typically used to transmit unidirectional data for (e.g., Internet Protocol (IP) datagrams, etc.). Unfortunately, opening and closing a TBF connection can take significant amounts of time (on the order of hundreds of milliseconds). Accordingly, in one embodiment of the present invention, the mobile device intelligently manages its currently running applications to minimize the effects of missed TBFs. Unlike typical NMO-2 operation, the mobile device does not suspend GPRS network operation (e.g., TBF suspension, etc.) prior to PCH decoding; thus, any GPRS data transmitted during the TBF period is missed. Due to the potential loss of GPRS data packets, the mobile device prioritizes CS Paging decoding based on its known applications; or alternately, the mobile device can rely on or plans for recoverable data loss, etc.

Idle periods are generally used by the mobile device for decoding BSIC (Base Station Identity Codes) of nearby base stations to facilitate handovers. This is a relatively low importance task; once the mobile device has a record of the nearby base stations, the idle periods are heavily underutilized. These periods can be used for PCH decoding.

Referring back to FIG. 3, at step 306, the mobile device determines if a Temporary Block Flow (TBF) overlaps with its anticipated GSM PCH schedule (calculated in step 302). If the TBF overlaps, then the time slots of the next multi-frame of the GPRS network will be allocated to the mobile device. Thus, for that upcoming brief TBF interval, the mobile device is free to check the GSM PCH (see step 308), if it is willing to accept the potential data loss. If, however, the Temporary Block Flow (TBF) does not overlap with the GSM PCH schedule, then the mobile device must decode the PCH during idle time slots (see step 320 and step 330 respectively).

At step 308, the mobile device references a priority table or other such data structure to determine the appropriate usage of the commandeered upcoming TBF interval. FIG. 4 illustrates one exemplary implementation of such a priority table. If the CS paging decode has a higher priority than the current SAPI (Service Access Point Identifier), then during the next Paging Cycle, the PCH is decoded (310). In the exemplary table of FIG. 4, "push" type email services are prioritized over GSM PCH decode, whereas other lower priority tasks such as HTTP and SMTP are subordinates. It will be appreciated, however, that the order or priority may vary from that shown, and in fact may be varied dynamically, such as via a user input, command from the parent network (e.g., via a base station, etc.). In the illustrated embodiment, the mobile device determines if the GSM PCH can be decoded without requiring a full GPRS TBF suspension in steps 320 and 330. If the Temporary Block Flow (TBF) does not overlap with the GSM PCH schedule then at step 320, the mobile device determines if the GSM PCH bursts are aligned with GPRS frame idle frames. The 26$^{th}$ (twenty-sixth) frame of the GPRS frame structure is always idle, for the aforementioned neighbor cell measurements (e.g., for handover, etc.). If the mobile device has up-to-date information of nearby cells or does not need such information (e.g., not interested in handover, etc.), and if the idle frame and PCH bursts overlap on those timeslots, then the mobile device may quickly perform GSM paging decodes.

Lastly, the mobile determines if the GSM PCH frames are scheduled during idle frames within the GPRS frame (step 330). For example, consider a mobile device that is assigned to timeslots 1 (one) and 7 (seven) for GPRS Uplink and Downlink access; at all other time slots, the device is idle. Accordingly, the timeslots 2 (two) through 6 (six) can be used for GSM paging decode if the PCH bursts overlap on those time slots.

At step 340, if the GSM PCH channel has a page for the mobile device, then at step 350, the GPRS data link is suspended (TBF suspend), and a circuit switched GSM call is established.

As previously discussed, the foregoing discussion is based primarily on GSM/GPRS/EDGE network technologies and features. Consequently, a description of generalized methods and apparatus for implementing one or more aspects of the present invention is now presented.

Methods—

Figure 5:
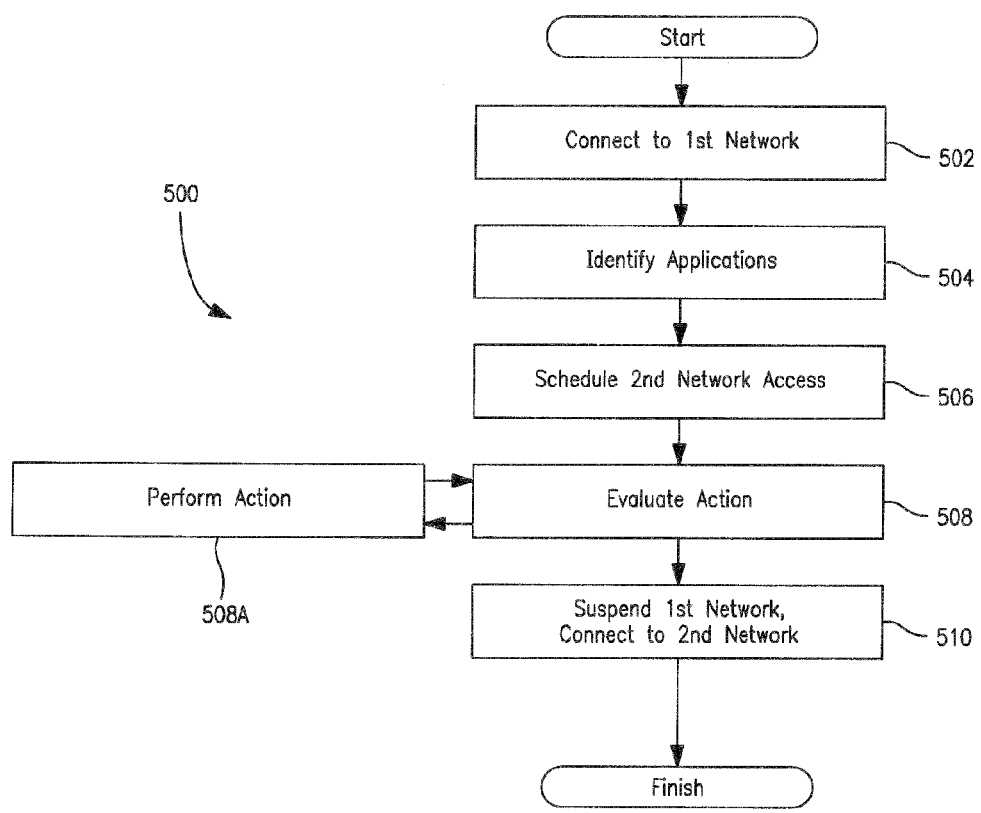
FIG. 5 is a logical flow diagram of one embodiment of the generalized process for monitoring multiple networks for paging notification, in accordance with the present invention.

Referring now to FIG. 5, exemplary embodiments of a generalized method 500 for paging channel reception for a secondary network interface, based at least in part on the current application load of a primary network interface. In one aspect of the present invention, a secondary network paging channel is only decoded during lulls or relatively unimportant periods in a primary network, thus very high priority applications would preempt secondary paging channel decoding. In contrast, lower priority primary network data activity could be briefly sidelined, to collect secondary network paging messages. The following methods refer to a first device which is connected to a first or primary network. Thereafter, the first device decodes paging messages of the second or secondary network.

Furthermore, while the following discussions are chiefly described with reference to a circuit switched secondary network and a packet switched primary network, the invention may be applicable to any communication system where there is no coordination between the primary and secondary domains. For example, future technologies like LTE-CDMA may blend multiple incompatible modes together. Moreover, wireless operation is not required to practice the present invention; it is appreciated that the present invention may also find particular use when combining exclusory wireline technologies, via the same physical media.

At step 502 of the method 500, the first device connects to the primary network. In one embodiment, the first device opens one or more active sessions with the primary network. The first device may also identify nearby networks. In some variations, the primary network may be compatible to some degree with the nearby networks. In others, the primary and nearby networks have no relation whatsoever.

In one embodiment, the first device identifies one or more secondary networks from the nearby networks the first device is e.g., a GSM/GPRS/EDGE enabled client, the primary network is a GPRS network, and the secondary network is a GSM network. Furthermore, in one such variant, the enabled client is a Class B GSM/GPRS/EDGE client, and the primary network is administered by a GPRS SGSN using a GSM Radio Access Network, via NMO-2 compliant operation.

At step 504, the first device identifies and maintains a list of current application priorities running in the primary network. In one implementation, the first device is willing to selectively miss messages from the first network, in order to get messages on the second network. For example, in a mobile device connected to a packet switched GPRS connection may selectively opt to miss low-priority messaging, so as to receive circuit switched GSM pages. The present invention also contemplates that certain GPRS data services may be more resilient to temporary data loss than others, and that this knowledge can be used to optimize operation of the system accordingly.

In one embodiment, each session or separable sub-section thereof, has a relative importance, and an associated quality of service Packet switched data services may be for example categorized in a first dimension according to their importance to the radio link, or running applications, and categorized in a second dimension according to their resilience to missed data. Such resilience may be measured for example in degrees of error correction, tolerable latency, acceptable loss, etc.

In one aspect of the present invention, each application running in the primary network is assigned a priority. In one such implementation, a task for periphery secondary paging channel access is assigned a priority relative to the primary network applications. The assignment of priorities by the first device allows the first device to adjust reception of secondary paging access, thereby minimizing impact of such periphery reception on the primary network. Similarly, the prioritization enables secondary paging access to trump the relatively low utilization of the first network. In one variant, the assignation of priorities is done based on a static "metric", such as application type (e.g., HTTP, SMTP, Streaming, etc.). In other variants, the assignation of priorities is done based on dynamic adjustment.

At step 506, the first device schedules periphery secondary network paging access. In one embodiment, the first device derives the schedule based on a pre-existing relationship between the first and second networks. For example, in GSM/GPRS networks, the GSM network has identical timing to the GPRS network; the mobile only needs to compensate for timing shift, and derive the appropriate paging channel. However, in other networks, there may not be any preexisting relationship. Analysis of such uncoordinated networks can yield an estimate of the number of packets, frames, data, etc. which would be missed in the periphery access. Based on the estimate, the first device can appropriately schedule periphery network access.

Furthermore, in other embodiments, the schedule may be impacted by other considerations. For example, the first device may wish to stagger secondary network paging access decoding attempts. Such staggering may be based on other device considerations such as power consumption, processing burden, application requirements, user "experience" (including e.g., perceived latency), etc.

At step 508, when the scheduled periphery secondary network access is triggered, the first device determines the appropriately prioritized action. If the secondary network access has a higher priority than other current actions, then the first device proceeds to step 510. Otherwise, if other primary network activities are more important, then the first device executes the appropriate action 508A, and waits for the next scheduled periphery event.

In one embodiment, the first device consults the prioritization schedule generated in step 504 to determine the appropriate action. The priorities may be updated according to different approaches; e.g., after each scheduled iteration. For example, in some cases it may be necessary to increase a priority for low priority tasks, such that they are performed at least some of the times. In other variants, the priorities are static, and do not change.

In yet other variants, certain other considerations may be present, for instance in isochronous applications (such as low bit rate streaming data), the data must be transmitted in a given time frame. However, there is no requirement for when the data is transmitted in the time frame (i.e., equally good if it is sent early, or late in the interval, as long as it is within the interval).

At step 510, if the first device detects a paging message on the secondary network, then the first device suspends primary network operation, and services the secondary network page. In other implementations, the first device may selectively answer the page. In yet other approaches, the first device may respond to the page without suspending primary network operation (i.e., allowing more data to fall by the wayside). In the exemplary embodiment, a class B device that determines that a GSM page is pending, will transmit a TBF suspend message to the GPRS SGSN, thereby halting further GPRS service.

Exemplary Mobile Apparatus—

Figure 6:
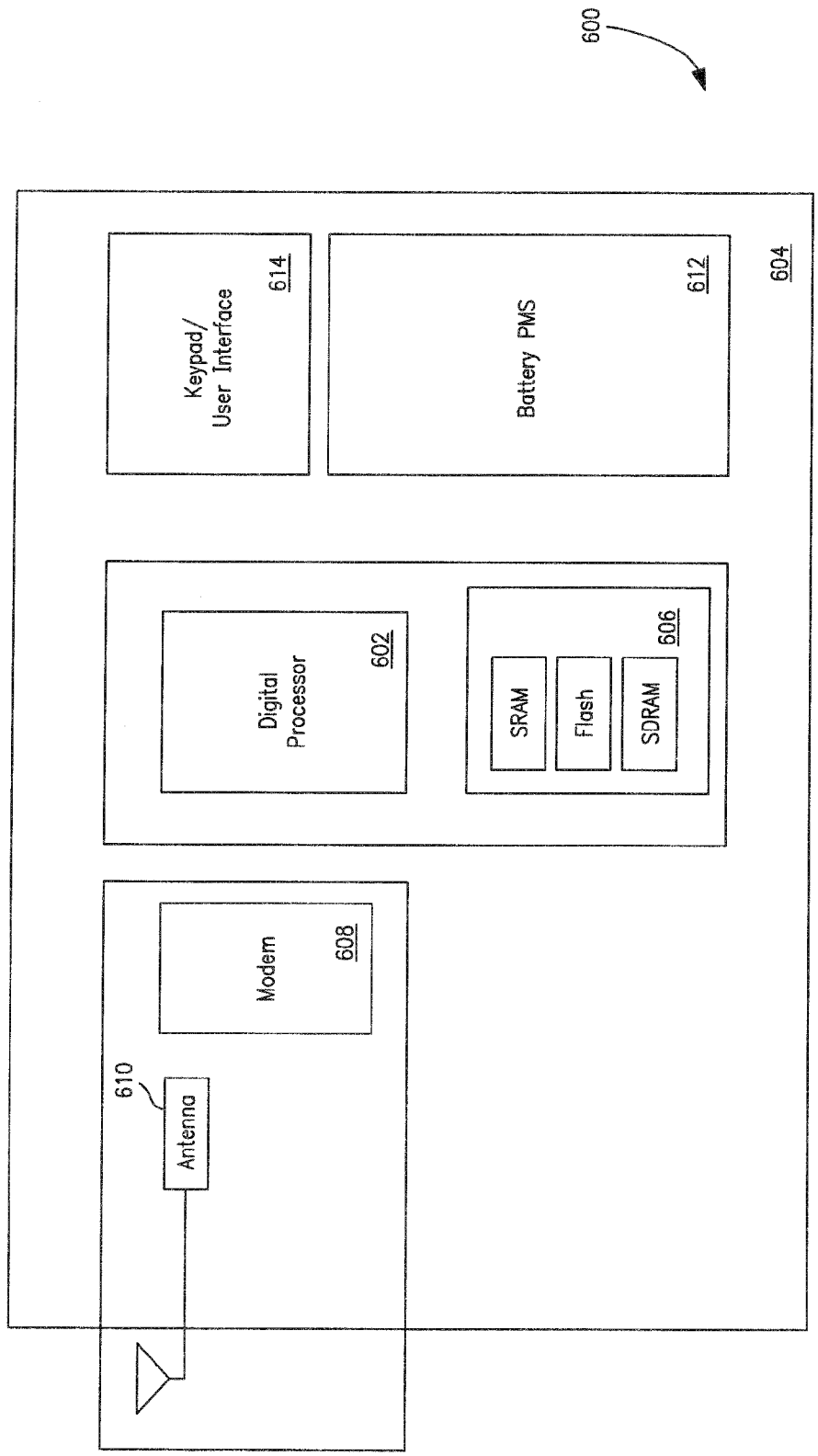
FIG. 6 is a block diagram of one embodiment of a client apparatus (e.g., mobile cellular device) configured in accordance with the present invention.

Referring now to FIG. 6, exemplary apparatus 600 useful for implementing the methods of the present invention is illustrated.

The apparatus 600 includes a processor subsystem 602 such as a digital signal processor, microprocessor, field-programmable gate array, or plurality of processing components mounted on one or more substrates 604. The processing subsystem may also comprise an internal cache memory. The processing subsystem 602 is connected to a memory subsystem 606 comprising memory which may for example, comprise SRAM, flash and SDRAM components. The memory subsystem may implement one or a more of DMA type hardware, so as to facilitate data accesses as is well known in the art.

The radio/modem subsystem 608 generally includes a digital baseband, analog baseband, TX frontend and RX frontend. The apparatus 600 further comprises an antenna assembly 610; the selection component may comprise a plurality of switches for enabling various antenna operational modes, such as for specific frequency ranges, or specified time slots. In certain embodiments, some components may be obviated or may otherwise be merged with one another (such as RF RX, RF TX and ABB combined, as of the type used for 3G digital RFs) as would be appreciated by one of ordinary skill in the art given the present disclosure.

The illustrated power management subsystem (PMS) 612 provides power to the apparatus, and may comprise an integrated circuit and or a plurality of discrete electrical components. In one exemplary portable mobile device implementation of the apparatus, the power management subsystem 612 interfaces with a battery.

In certain embodiments of the apparatus, a user interface system 614 may be provided. A user interface may include any number of well-known I/O including, without limitation: a keypad, touch screen or "multi-touch" screen, LCD display, backlight, speaker, and microphone. However, it is recognized that in certain applications, one or more of these components may be obviated. For example, PCMCIA card type mobile device embodiments may lack a user interface (as they could piggyback onto the user interface of the device to which they are physically and/or electrically coupled).

The apparatus of FIG. 6 may further include optional additional peripherals including, without limitation, one or more GPS transceivers, or network interfaces such as IrDA ports, Bluetooth transceivers, Wi-Fi (IEEE Std. 802.11) transceivers, WiMAX (IEEE Std. 802.16e) transceivers, USB (e.g., USB 2.0, USB 3.0, Wireless USB, etc.), FireWire, etc. It is however recognized that these components are not necessarily required for operation of the apparatus 600 in accordance with the principles of the present invention.

Business Methods and Rules—

It will be recognized that the foregoing apparatus and methodologies may enable, and be readily adapted to, various business models.

In one such business paradigm, appropriately enabled user-equipment may robustly receive cellular pages (receiving service notifications faster), efficiently monitor existing paging channels of multiple networks, and thereby increase the overall perceived quality of experience. While legacy devices can only effectively receive pages from a single network at a time, devices implementing the present invention can quickly straddle multiple-network operation. The forgoing approaches are markedly more efficient, and may also significantly improve power consumption by the mobile device, thereby extending battery life and hence user experience. Such devices can be offered by the network operator or manufacturer as "upgraded" or "premium" devices for this reason, and may even command higher prices and/or subscription fees. Alternatively, they may be offered as an incentive by the network operator to its existing subscribers, such as in exchange for extending the term and/or services associated with their subscription.

Myriad other schemes for implementing, and business method for exploiting, paging channel recovery will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for receiving messages via a secondary network while connected to a primary network, wherein the primary and secondary networks are normally exclusionary, comprising:
   scheduling one or more evaluation events;
   prioritizing one or more applications in communication with the primary network;
   for each evaluation event, determining whether to check the secondary network for messages, the determining based at least in part on the prioritization of the one or more applications and a priority of the checking for messages; and
   for evaluation events of which the secondary network is checked for messages:
      ignoring one or more application data elements associated with a first application of the one or more applications received via a primary interface from the primary network; and
      detecting at least one message via a secondary interface from the secondary network, while transferring application data associated with a second application of the one or more applications over the primary network via the primary interface.

2. The method of claim 1, wherein the primary network is a packet-switched network, and the secondary network is a circuit-switched network.

3. The method of claim 1, wherein the primary network is a General Packet Radio Service (GPRS) network, and the secondary network is a Global System for Mobile (GSM) network.

4. The method of claim 3, further comprising receiving messages from the secondary network via the secondary interface.

5. The method of claim 4, wherein the receiving of messages via the secondary interface occurs during a GPRS Temporary Block Flow (TBF) period of the primary network.

6. The method of claim 4, wherein the receiving of messages via the secondary interface occurs during a GPRS idle frame period of the primary network.

7. The method of claim 4, wherein the receiving of messages via the secondary interface occurs after a successful GPRS Base Station Identity Codes (BSIC) decode period of the primary network.

8. The method of claim 3, wherein the scheduling of the one or more evaluation events occurs when GSM idle slots overlap corresponding GPRS Packet Data Traffic Channel (PDTCH) time slots.

9. The method of claim 1, wherein the messages detected via the secondary interface are paging messages.

10. The method of claim 1, wherein the ignoring of the one or more application data elements associated with the first application received from the primary network does not suspend data transfers of application data associated with the second application over the primary network via the primary interface.

11. The method of claim 1, wherein the primary network and the secondary network have similar time bases such that a portion of their respective channel time slots substantially align.

12. The method of claim 1, wherein each of the one or more applications in communication with the primary network are prioritized according to an associated Quality of Service (QoS) parameter.

13. A mobile apparatus, comprising:
   a digital processor one or more processors;
   a primary wireless interface in data communication with coupled to the processor one or more processors;
   a secondary wireless interface in data communication with coupled to the processor one or more processors; and
   a storage device in data communication with coupled to the processor one or more processors, the storage device comprising computer-executable instructions that, when executed by the digital processor one or more processors, cause the mobile apparatus to:
      generate a list of one or more applications, the list of applications based at least in part on one or more applications coupled to that communicate via the primary wireless interface;
      assign a corresponding priority to each application of the generated list, and an access priority for the secondary wireless interface;
      schedule one or more evaluation events; and
      during an evaluation event of the one or more evaluation events, select and execute at least one application from the list of one or more applications, based at least in part on the assigned priorities of the one or more applications and on the access priority for the secondary wireless interface, wherein the selected at least one application transfers application data via the primary wireless interface during communications via the secondary wireless interface.

14. The mobile apparatus of claim 13, wherein the access priority for the secondary wireless interface is associated with a paging message access priority.

15. The mobile apparatus of claim 13, wherein at least one application of the one or more applications in communication with the primary wireless interface is error tolerant and has a corresponding Quality of Service (QoS) parameter.

16. The mobile apparatus of claim 15, wherein the at least one error tolerant application is assigned a priority within the generated list of one or more applications based at least in part on its corresponding QoS parameter.

17. The mobile apparatus of claim 13, wherein the primary wireless interface is General Packet Radio Service (GPRS) compliant, and the secondary wireless interface is Global System for Mobile communications (GSM) compliant.

18. The method of claim 1, wherein the first application of the one or more applications is assigned a lower priority than a priority assigned to the second application of the one or more applications.

19. The method of claim 18, wherein the ignoring one or more application data elements associated with the first application of the one or more applications occurs based at least in part on a determination that the first application is assigned a lower priority than the priority of the checking for messages.

20. The method of claim 18, wherein the transferring application data associated with the second application of the one or more applications occurs based at least in part on a determination that the second application is assigned a higher priority than the priority of the checking for messages.

* * * * *

UNITED STATES PATENT AND TRADEMARK OFFICE
CERTIFICATE OF CORRECTION

PATENT NO. : 8,630,667 B2  
APPLICATION NO. : 12/643921  
DATED : January 14, 2014  
INVENTOR(S) : Venkatasubramanian Ramasamy et al.

Page 1 of 1

It is certified that error appears in the above-identified patent and that said Letters Patent is hereby corrected as shown below:

On the Title Page  
Item (75) Inventors: "Girl" Prassad Deivasigamani. Correct the first name to "Giri".

In the Claims  
Col. 13, line 48: In the phrase "of the checking". Delete the word "the".

Col. 14, line 36: Delete "a digital processor".

Col. 14, line 37: Delete "in data communication with".

Col. 14, line 38: Delete "processor".

Col. 14, line 39: Delete "in data communication with".

Col. 14, line 40: Delete "processor".

Col. 14, line 41: Delete "in data communication with".

Col. 14, line 42: Delete "processor".

Col. 14, line 44: Delete "digital processor".

Col. 14, lines 46-48: Delete the following phrase: ", the list of applications based at least in part on one or more applications coupled to".

Signed and Sealed this  
First Day of April, 2014

Michelle K. Lee  
*Deputy Director of the United States Patent and Trademark Office*